(12) United States Patent
Kho et al.

(10) Patent No.: US 12,305,086 B2
(45) Date of Patent: May 20, 2025

(54) ASSEMBLY PROCESS USING LIQUID OPTICALLY CLEAR ADHESIVE FOR SUPPORT OF THIN COMPONENTS

(71) Applicant: United States of America as represented by the Secretary of the Navy, San Diego, CA (US)

(72) Inventors: Yong An Kho, San Diego, CA (US); Steven Mancewicz, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 387 days.

(21) Appl. No.: 17/875,145

(22) Filed: Jul. 27, 2022

(65) Prior Publication Data
US 2024/0034910 A1  Feb. 1, 2024

(51) Int. Cl.
| C09J 5/04 | (2006.01) |
| C09J 7/20 | (2018.01) |
| C09J 7/40 | (2018.01) |

(52) U.S. Cl.
CPC . *C09J 5/04* (2013.01); *C09J 7/20* (2018.01); *C09J 7/403* (2018.01);
(Continued)

(58) Field of Classification Search
CPC ....... C09J 2203/326; C09J 5/04; H05K 3/043; H05K 3/025; H02J 50/20
See application file for complete search history.

(56) References Cited

U.S. PATENT DOCUMENTS

| 5,749,994 A * | 5/1998 | Sundet | B32B 17/10247 |
| | | | 428/137 |
| 2011/0304520 A1* | 12/2011 | Djordjevic | H01Q 21/0087 |
| | | | 343/893 |

(Continued)

OTHER PUBLICATIONS

Yan ("Highly stretchable and shape-controllable three-dimensional antenna fabricated by 'Cut-Transfer-Release' method", Scientific Report, 7:42227, Feb. 13, 2017) (Year: 2017).*

(Continued)

*Primary Examiner* — Michael A Tolin
*Assistant Examiner* — Hana C Page
(74) *Attorney, Agent, or Firm* — Naval Information Warfare Center, Pacific; Kyle Eppele; Evan Hastings

(57) ABSTRACT

An assembly process using liquid optically clear adhesive for support of thin components. The method comprising the steps of placing a release liner and substrate, determining the placement location of the embedding material, positioning the embedding material on the determined placement location, applying a first LOCA, sandwiching the embedding material between the contact side of the substrate and the release side of the release liner to create an initial assembly, curing the first LOCA, removing the release liner, securing the substrate onto a cutting mat with the embedding material and first LOCA facing up, cutting a detailed design, transferring the initial assembly to the work surface, removing unwanted embedding material, applying a second LOCA, sandwiching the detailed design, curing the second LOCA, cleaning the final assembly, and trimming the edges of the final assembly to the size and shape of a final product.

10 Claims, 8 Drawing Sheets

Removed embedding material cavity 130

(52) U.S. Cl.
CPC .... *C09J 2301/208* (2020.08); *C09J 2301/416* (2020.08); *C09J 2301/502* (2020.08)

(56) References Cited

U.S. PATENT DOCUMENTS

2016/0381810 A1* 12/2016 Fischer ................ H05K 3/4635
  174/251
2024/0121889 A1* 4/2024 Chang ...................... H05K 1/18

OTHER PUBLICATIONS

Yoo (English Translation of KR1001335918). (Year: 2013).*

* cited by examiner

Detailed design 110

Removed embedding material cavity 130

Final product 610

ASSEMBLY PROCESS USING LIQUID OPTICALLY CLEAR ADHESIVE FOR SUPPORT OF THIN COMPONENTS

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72610, San Diego, CA, 92152; telephone (619) 553-5118; email: niwc_patent.fct@us.navy.mil, referencing Navy Case 112,155.

FIELD OF USE

The present disclosure pertains generally to an assembly process using adhesive for support of thin components. Specifically, this disclosure may including using liquid optically clear adhesive for tuned microwave components.

BACKGROUND OF THE INVENTION

Placing finely detailed designs onto a substrate generally involves the deposition of material or an etching process removing a material via a mask or mill. Typical deposition methods require a device that can precisely deposit a material onto a desired site, such as a three-dimensional ("3-D") printer. 3-D printing is complex and expensive, especially if the chosen depositing material is metal. On the other hand, etching a material away using a mask or mill has its own drawbacks. Lithography, chemical etching, or other etching methods typically require a clean-room environment and require the operator wear safety equipment (e.g. masks), posing additional costs and inefficiencies. Finally, milling methods also involve costly equipment, are difficult to apply delicate materials, and have limitations on which materials may be used.

SUMMARY

A method of using liquid optically clear adhesive ("LOCA") for support of thin components, comprising the steps of: placing a release liner and a substrate on a work surface; determining the placement location of the embedding material, wherein the placement location is on either the contact side of the substrate or the release side of the release liner, based on which placement location is better suited for static cling on the embedding material; positioning the embedding material on the determined placement location; applying a first LOCA onto the embedding material and the placement location; sandwiching the embedding material between the contact side of the substrate and the release side of the release liner to create an initial assembly, wherein the substrate and release liner are aligned; curing the first LOCA with a ultraviolet light; removing the release liner from the initial assembly; securing the substrate onto a cutting mat with the embedding material and first LOCA facing up; cutting the detailed design, cutting the detailed design, wherein cutting defines the detailed design and an unwanted embedding material; transferring the initial assembly to the work surface with the first LOCA and embedding material facing up; removing the unwanted embedding material from the initial assembly; applying a second LOCA onto the details design; sandwiching the detailed design between the contact side of the second substrate and initial assembly to form a final assembly, wherein the quantity of second LOCA applied is at least enough to cover the detailed design; curing the second LOCA with the ultraviolet light; cleaning the final assembly by wiping up excess first LOCA and second LOCA with isopropyl alcohol; and trimming the edges of the final assembly to the size and shape of a final product.

It is an object to provide a method of using liquid optically clear adhesive for support of thin components that offers numerous benefits, including a quick, inexpensive, safe, and delicate process for placing finely detailed designs onto thin components. Additionally, a protective mask is not required for use of method 10, whereas one is typically necessary for chemical etching and lithography.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
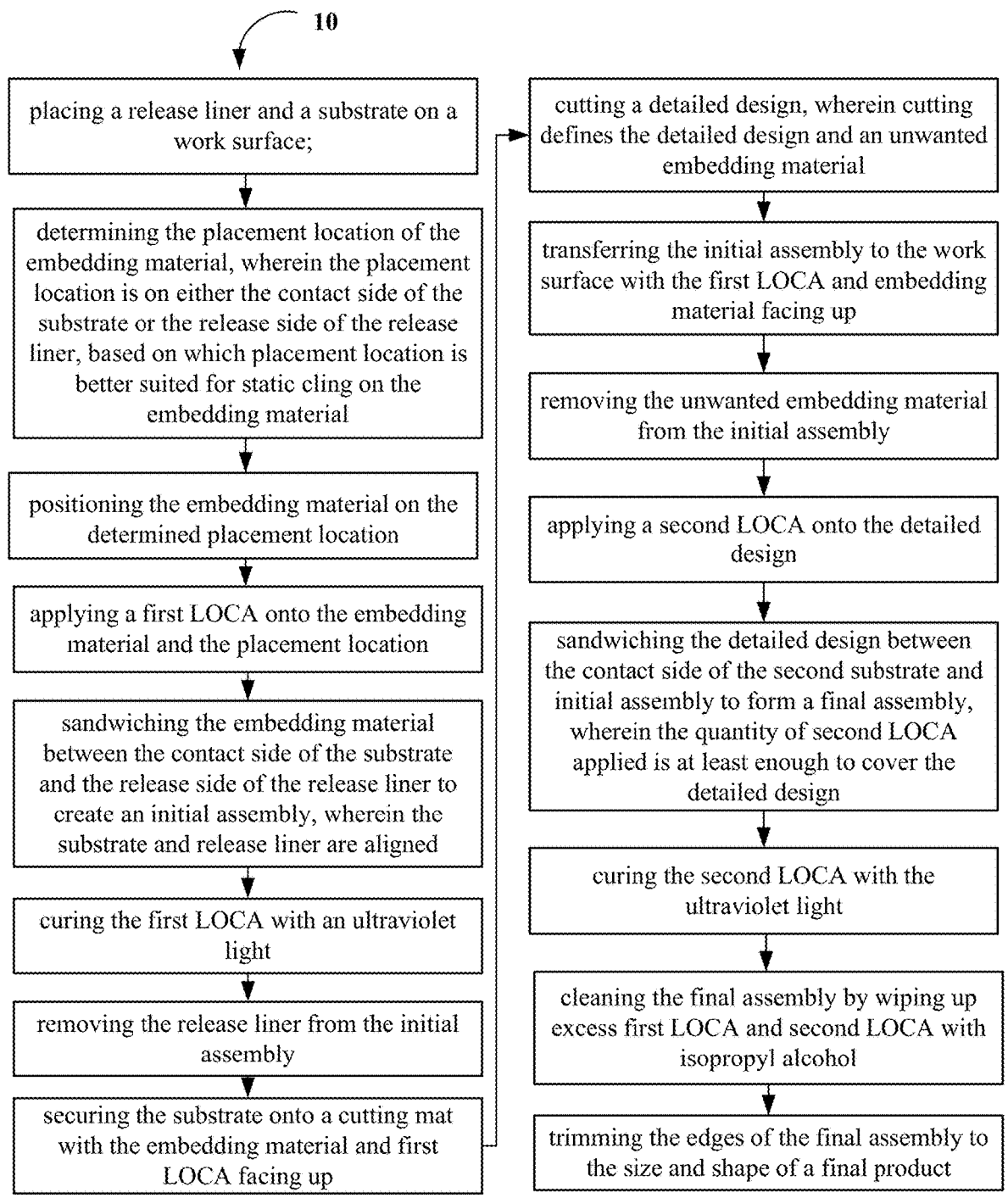
FIG. 1 shows a method for a method of using liquid optically clear adhesive (LOCA) for support of thin components.

FIG. 1 is an example illustration of a method 10 for using liquid optically clear adhesive ("LOCA") for support of thin components, the steps comprising: placing a release liner and a substrate on a work surface; determining the placement location of the embedding material 100, wherein the placement location is on either the contact side of the substrate or the release side of the release liner 300, based on which placement location is better suited for static cling on the embedding material 100; positioning the embedding material 100 on the determined placement location; applying a first LOCA 410 onto the embedding material 100 and the placement location; sandwiching the embedding material 100 between the contact side of the substrate 200 and the release side of the release liner 300 to create an initial assembly 500, wherein the substrate 200 and release liner 300 are aligned; curing the first LOCA 410 with an ultraviolet light; removing the release liner 300 from the initial assembly 500; securing the substrate 200 onto a cutting mat with the embedding material 100 and first LOCA 410 facing up; cutting a detailed design 110, wherein the cutting defines the details design 110 and an unwanted embedding material 120; transferring the initial assembly 500 to the work surface with the first LOCA 410 and embedding material facing up; removing the unwanted embedding material 120 from the initial assembly 500; applying a second LOCA 420 onto the detailed design 110; sandwiching the detailed design 110 between the contact side of the second substrate and initial assembly 500 to form a final assembly 600, wherein the quantity of second LOCA applied is at least enough to cover the detailed design; curing the second LOCA 420 with ultraviolet light; cleaning the final assembly by wiping up excess first LOCA 410 and second LOCA 420 with isopropyl alcohol; and trimming the edges of the final assembly 600 to the size and shape of a final product 610.

The materials for method 10 comprise: a substrate 200, an embedding material 100, a LOCA 400, a squeegee, cutting mat, an ultraviolet light source, and a release liner 300. The LOCA 400 may manifest as a first LOCA 410 or a second LOCA 420. Furthermore, the environment must have ultraviolet light levels sufficiently low as to not induce curing of the LOCA 400. In some embodiments the materials may also include one or more of the following: isopropyl alcohol, clear plastic sheets, and lint free paper towels.

Figure 2:
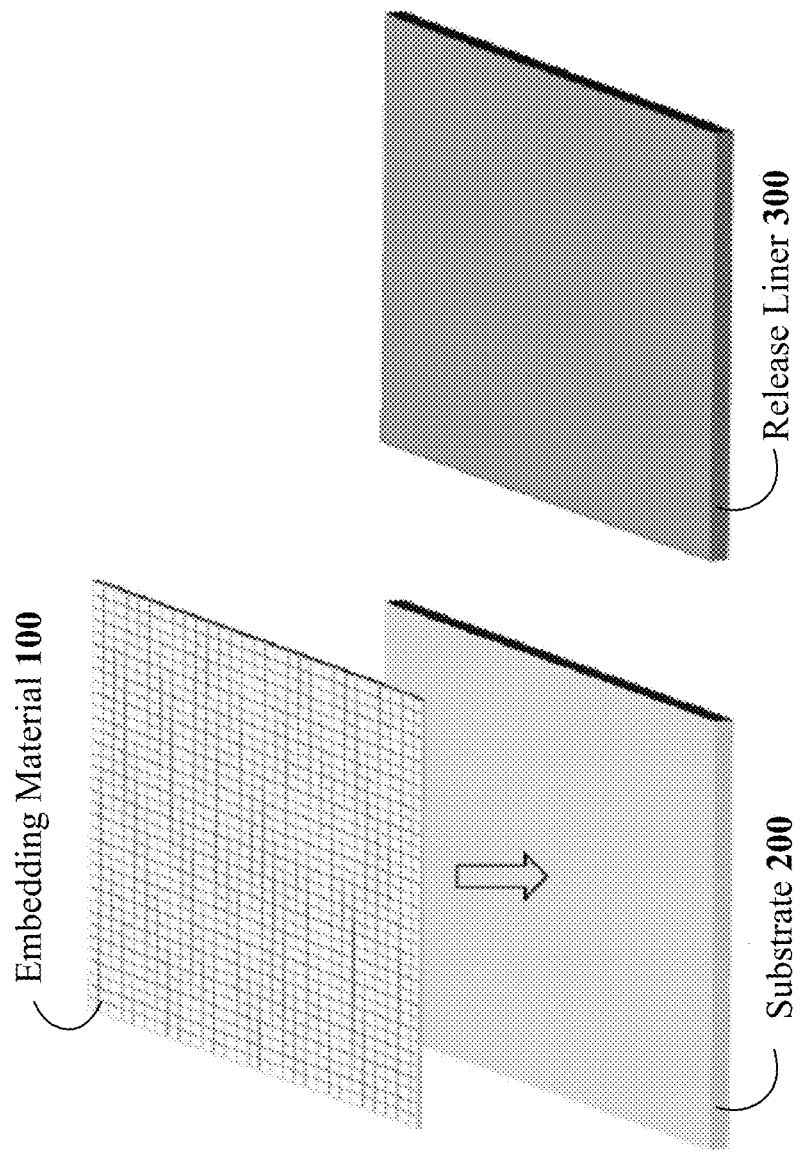
FIG. 2 is an example illustration of placing the substrate next to the release liner with the contact side facing up; determining the placement location of the embedding material, wherein the placement location is on either the contact side of the substrate or the release side of the release liner and is based on which placement location is better suited for static cling on the embedding material; placing the embedding material on the determined placement location.

FIG. 2 is an example illustration of placing a release liner and a substrate on a work surface; determining the placement location of the embedding material 100, wherein the placement location is on either the contact side of the substrate or the release side of the release liner 300 and is based on which placement location is better suited for static cling on the embedding material 100; placing the embedding material on the determined placement location. FIG. 2 comprises an embedding material 100, substrate 200, and release liner 300. The embedding material 100 is shown being placed on top of the substrate, but the disclosure is not so limited. The embedding material 100 may either be placed on the substrate 200 or release liner 300, which is a determination made based on static cling. Static cling works to hold the embedding material 100 as it is flattened out. The preferred placement location is where static cling holds the embedding material 100 to the placement location to aid in the application of the embedding material to either the substrate 200 or release liner 300. The embedding material 100 may be a thin and delicate material, so this manner of application reduces the change of tearing, bunching, or improper placement.

The embedding material 100 comprises a foil, mesh, or other delicate material having a detailed design 110. Specifically, the embedding material 100 may be applied so as to make tuned microwave components, shielding, circuits, or screening. The embedding material 100 may be of any size reasonably suited to be manipulated by hand. In some embodiments, the embedding material 100 is transparent.

The substrate 200 comprises a contact side and is capable of supporting the embedding material 100 and release liner 300. The contact side interfaces with the embedding material and may have static cling when interfacing with the embedding material 100. In one embodiment, the substrate comprises a plastic material. Additionally, the substrate may be translucent as to allow ultra-violent lent to pass through and cure a LOCA 400. The substrate 200 may be placed on a work surface to allow for easy access throughout the steps of method 10.

The release liner 300 comprises a release side for providing an interface with the embedding material. The release liner 300 is one typical for adhesive application. Additionally, the release liner 300 may have static cling when interfacing with an embedding material 100. The static cling helps the embedding material fix itself to the release liner and stay in place once attached. The release liner 300 may be placed on a work surface to allow for easy access throughout the steps of method 10.

Figure 3:
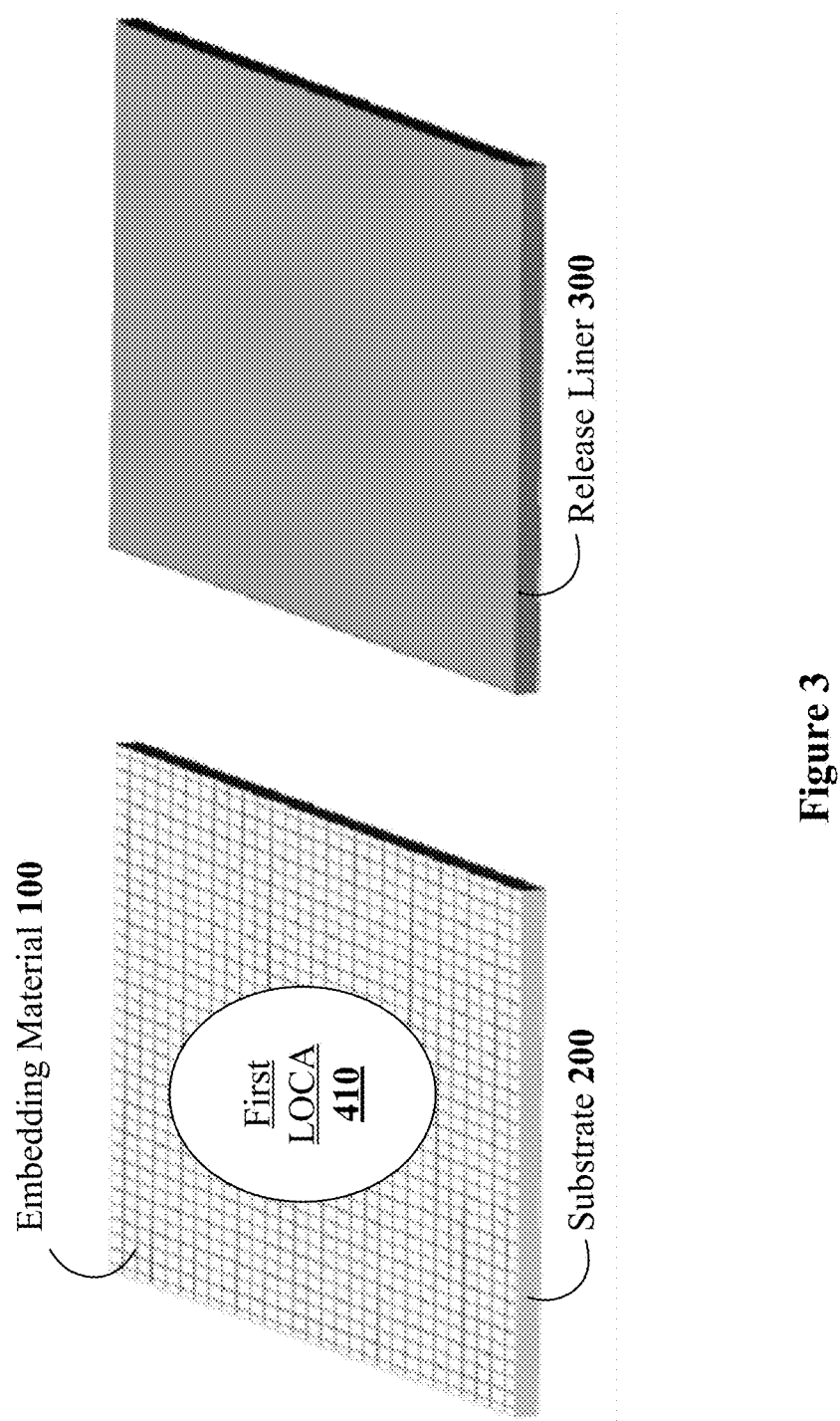
FIG. 3 is an example illustration of applying a first LOCA onto the determined placement location.

FIG. 3 is an example illustration comprising an embedding material 100, substrate 200, release liner 300, and LOCA 400. This is illustrative of the step of method 10 of applying a first LOCA 400 onto the embedding material and the placement location. At this step, care should be taken to apply the correct amount of LOCA 400. The correct amount of LOCA 400 is the amount to sufficiently cover the detailed design 110 and final product 610.

In one embodiment, method 10 may further comprise the step of placing a plastic sheet on top of the assembly; and squeegeeing the assembly to spread the first LOCA 410 evenly over the detailed design 110, wherein the detailed design comprises the embedded material. Furthermore, working from the center out and removing any air bubbles to the edges will help result in a uniform final product. The plastic sheet is optional, but helps reduce scratches on the final product. Isopropyl alcohol may then be used to wipe up any excess first LOCA 410. In another embodiment, a press may be used to squeeze out any excess first LOCA 410.

The LOCA 400 is capable of adhering two materials, subject to a curing process, and is capable of setting the adhesive. The curing process may be performed with a ultra-violet ("UV") light source. In one embodiment, the UV light source may be a UV lamp. In another embodiment, the UV light source may be the sun. Method 10 utilizes two distinct applications of LOCA 400. The first LOCA 410 adheres the embedding material to the placement location. There is also a second LOCA 420 that adheres embedding material 100 to the second substrate 100. LOCAs 400 come in a variety of types with a variety of adhesive properties. In one embodiment, the types of first LOCA 410 and second LOCA 420 may be the same. In another embodiment, the types of first LOCA 410 and second LOCA 420 application may be different. For example, the first LOCA 410 may have a low-strength adhesive profile. A low-strength adhesive profile may be preferable for easy removal of embedding material. On the other hand, the second LOCA 420 may have a high-strength profile, which may provide, in lieu of other benefits, durability over time.

In another embodiment, a pressure sensitive adhesive may be used in place of a LOCA. A pressure sensitive adhesive may be harder to use because the delicate embedding material will stick to the substrate before all the wrinkles and bubbles are worked out. The LOCA may provide more time to work the embedding material to the desired location.

In another embodiment, a heat sensitive adhesive may be used and allows for time to work the embedding material. However, protective layers of the substrate 200 would need to be removed while cutting, which would make floating pieces or intricate designs difficult to achieve. Instead, method 10 cuts the embedding material in between the substrates and leaves the outer layers intact.

Figure 4:
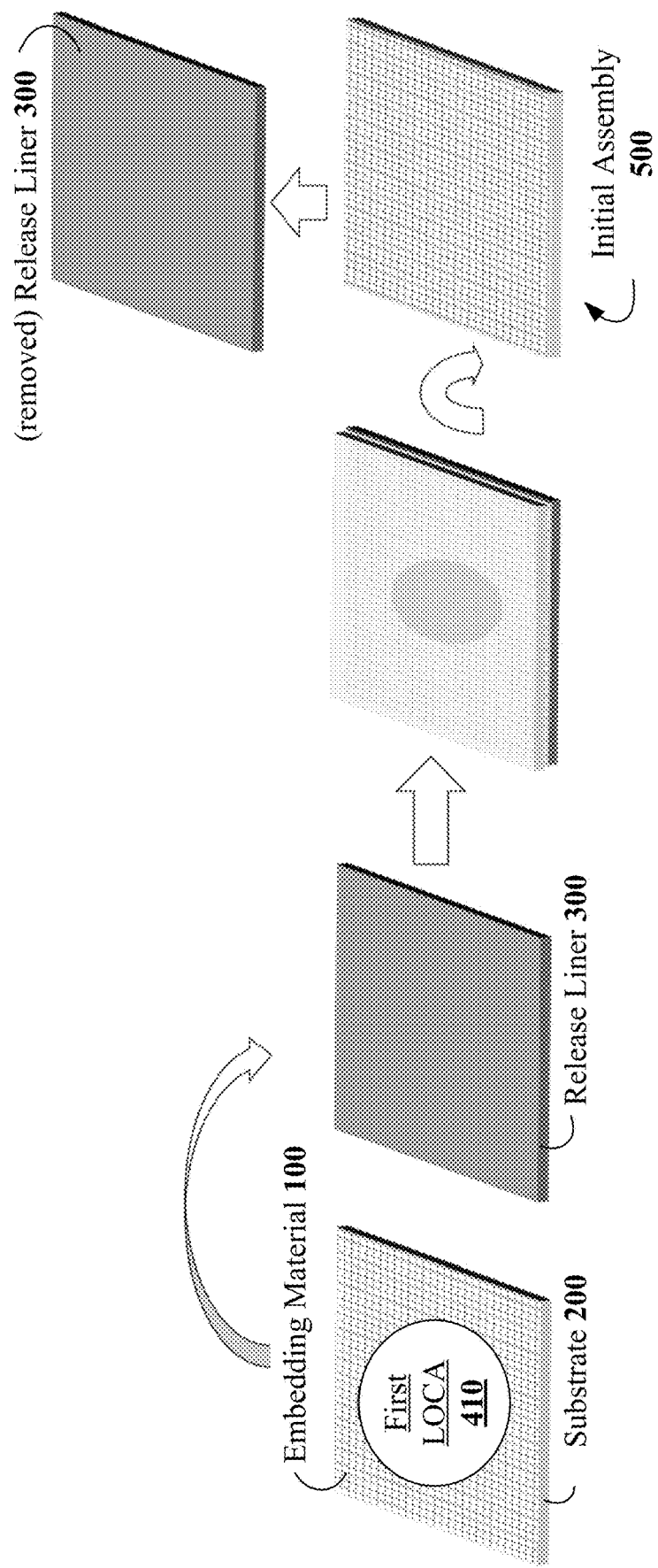
FIG. 4 is an example flow-diagram of sandwiching the embedding material between the contact side of the substrate and the release side of the release liner to create an initial assembly, wherein the substrate and release liner are aligned, curing the first LOCA with an ultraviolet light, and removing the release liner from the initial assembly.

FIG. 4 is an example illustration of sandwiching the embedding material 100 between the contact side of the substrate 200 and the release side of the release liner 300 to create an initial assembly 500, wherein the substrate 200 and release liner 300 are aligned, curing the first LOCA 410 with an ultraviolet light, and removing the release liner 300 from the initial assembly 500. The arrows in FIG. 4 help illustrate these steps of method 10. The left-most (curved) arrow demonstrates sandwiching the embedding material 100 between the substrate 200 and the release liner 300. The center arrow indicates that the product of the aforementioned step is the initial assembly 500 and an attached release liner 300. The flip (u-shaped) arrow indicates the turning over of the initial assembly 500 and release liner 300. Finally, the up arrow indicates removing the release liner 300 from the initial assembly 500.

Regarding the step of curing the first LOCA 410, exposure to UV light operates set the adhesive. The duration of the curing step is determined by the particular type of LOCA 400 and is typically prescribed by the manufacturer. Moreover, the substrate 200 comprises a material sufficiently translucent to allow UV light to cure the LOCA 400. In one embodiment, the UV light source is a UV emitting lightbulb. In another embodiment, the UV light source may be the sun.

In both of the aforementioned embodiments, the LOCA 400 is facing the light so as to cure evenly.

Figure 5:
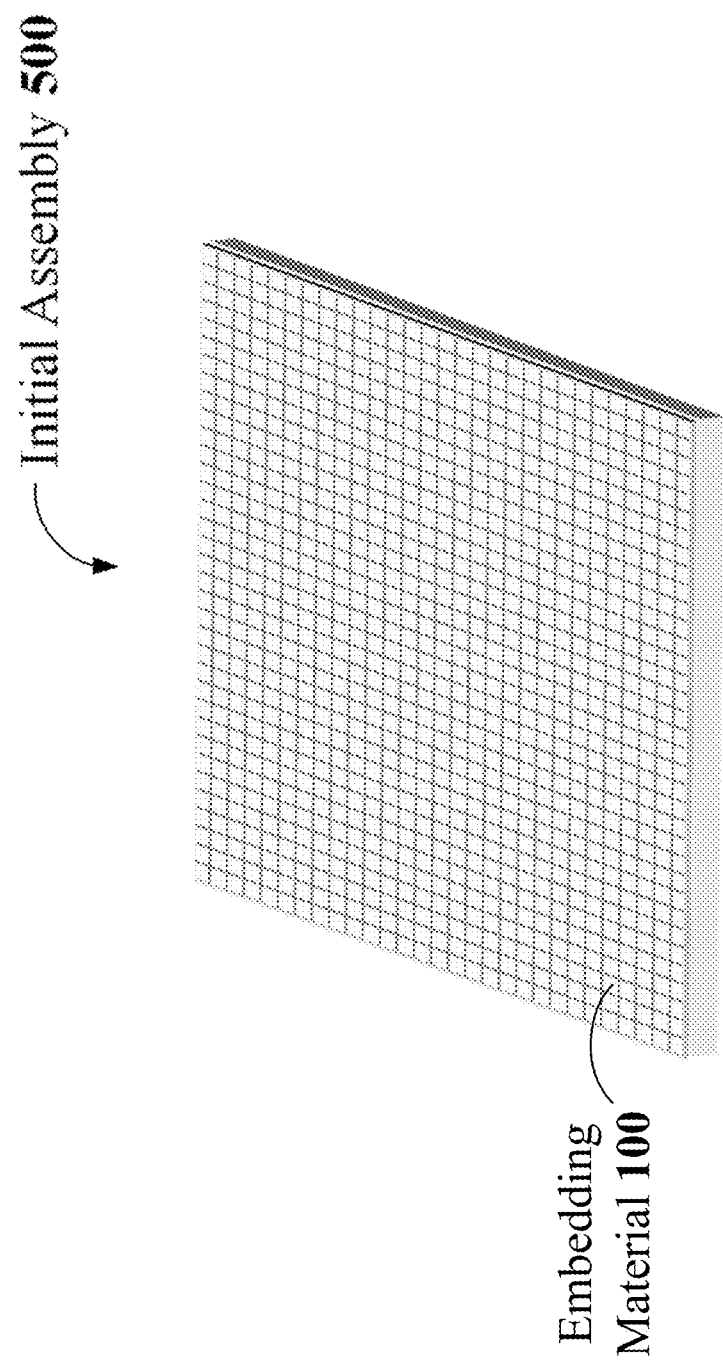
FIG. 5 is an example illustration of an initial assembly with exposed embedding material.

FIG. 5 is an example illustration of an initial assembly 500 with exposed embedding material 100. When the release liner 300 is removed from the initial assembly 500, the embedding material 100 is exposed. After the step of removing the release liner from the initial assembly, the LOCA 410 may not look translucent. Subsequently, the initial assembly 500 is prepared for transferring the initial assembly 500 to the work surface with the first LOCA 410 and embedding material 100 facing up.

Figure 6A:
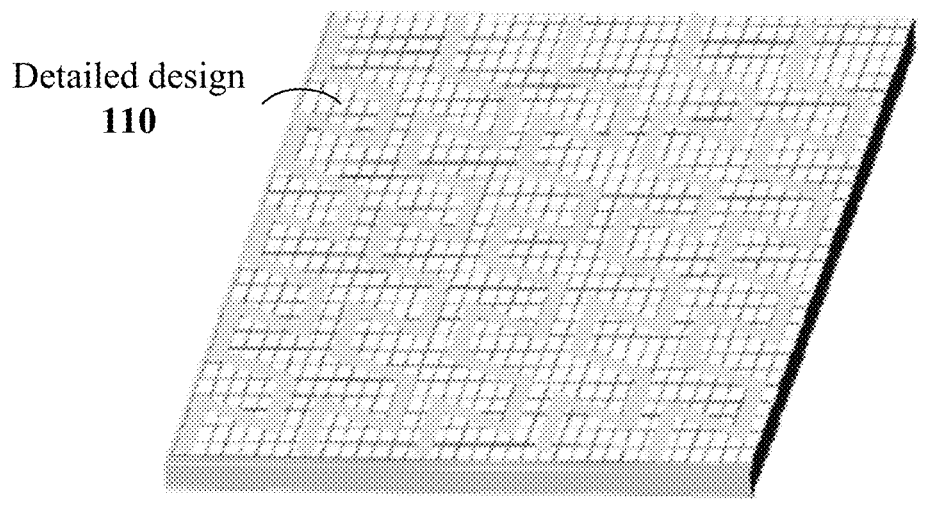
FIG. 6A is an example illustration of cutting a detailed design.

FIG. 6A is an example illustration of cutting the detailed design, wherein cutting defines the detailed design and an unwanted embedding material. The detailed design 110 has a geometry configured to enable the functionality of a thin microwave component. Cutting the detailed design defines said geometry of the detailed design 110. Furthermore, cutting may also define two distinct portions of the embedding material 100. First, a portion of the embedding material that comprises the detailed design 110. Second, the other portion of the embedding material 100 is unwanted embedding material 120 that is removed from the assembly. The removal of the unwanted embedding material 120 created a cavity 130 in the initial assembly 500. After cutting the detailed design, method 10 may include transferring the initial assembly to the work surface with the first LOCA and embedding material facing up.

Figure 6B:
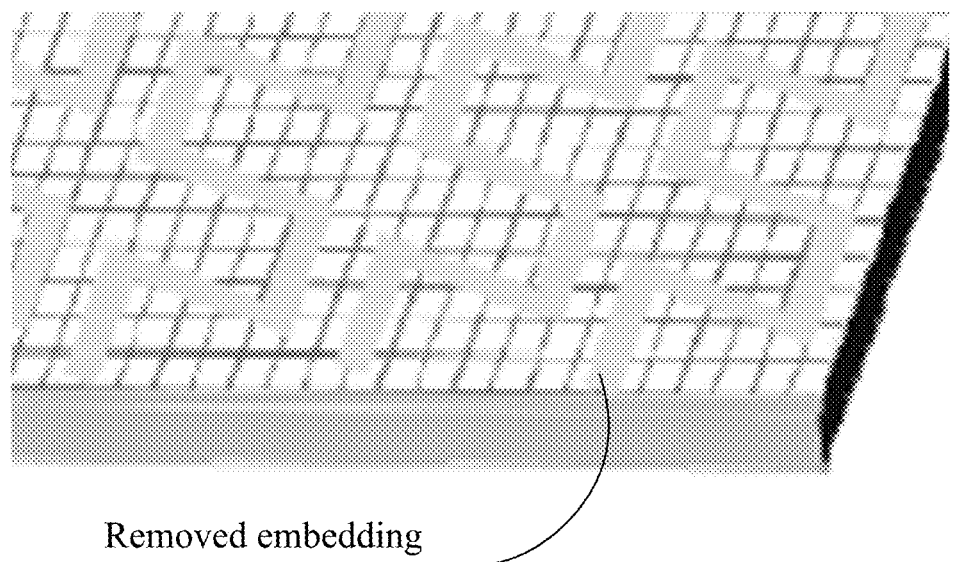
FIG. 6B is an example illustration of removing the unwanted embedding material from the initial assembly.

FIG. 6B is an example illustration of removing the unwanted embedding material 120 from the initial assembly 500. Specifically, FIG. 6B illustrates the removed embedding material cavity 130 left over after the unwanted embedding material is removed from the initial assembly 500. The removal of the unwanted embedding material will expose and define the detailed design. Additionally, the excess LOCA associated with the unwanted embedding material 120 may also be removed. It should be noted that that the cutting depth and strength should be set appropriately so to cut through the embedding material 100, but not through the substrate 200. In one embodiment, the cutting mat may be a plotter cutting mat.

Figure 7:
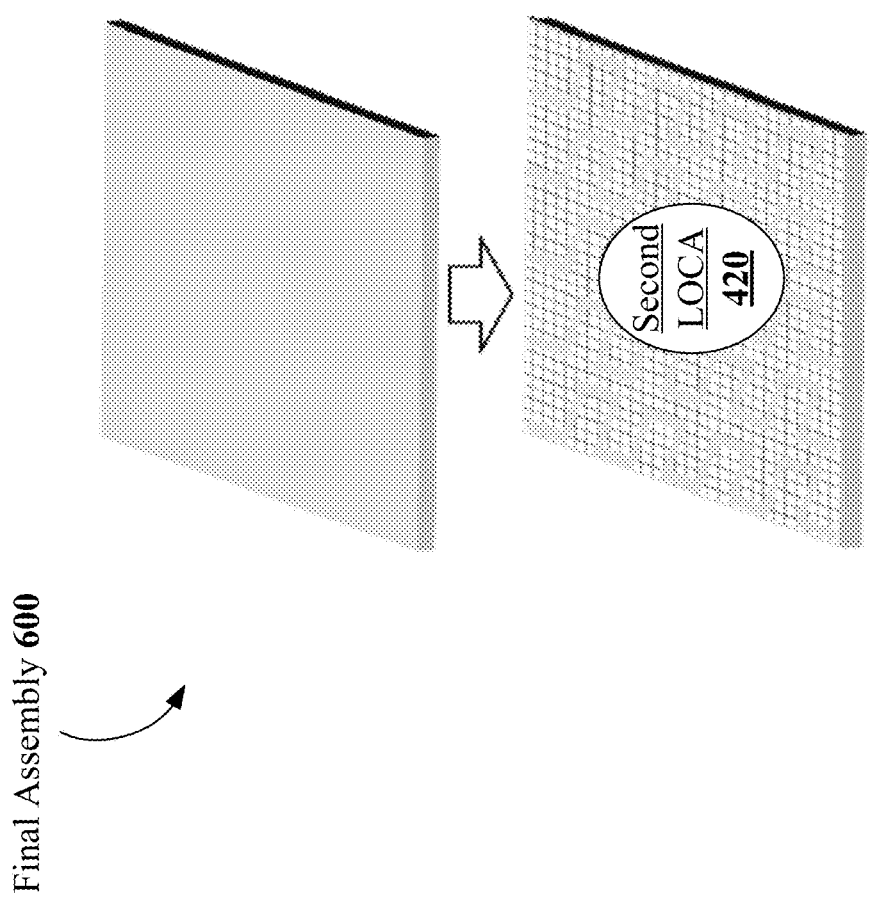
FIG. 7 is an example illustration of applying a second LOCA onto the embedding material and a second substrate to form a final assembly.

FIG. 7 is an example illustration of applying a second LOCA 420 onto the detailed design 110 and sandwiching the detailed design 110 between the contact side of the second substrate and initial assembly 500 to form a final assembly, wherein the quantity of second LOCA 420 applied is at least enough to cover the detailed design 110. Thereafter, the final assembly 600 is prepared for curing the second LOCA 420 with ultraviolet light, and cleaning the final assembly by wiping up excess first LOCA 410 and second LOCA 420 with isopropyl alcohol. The LOCA 400 left behind from the removed embedding material can also be removed, but may not be necessary if not much residue is left behind.

Figure 8:
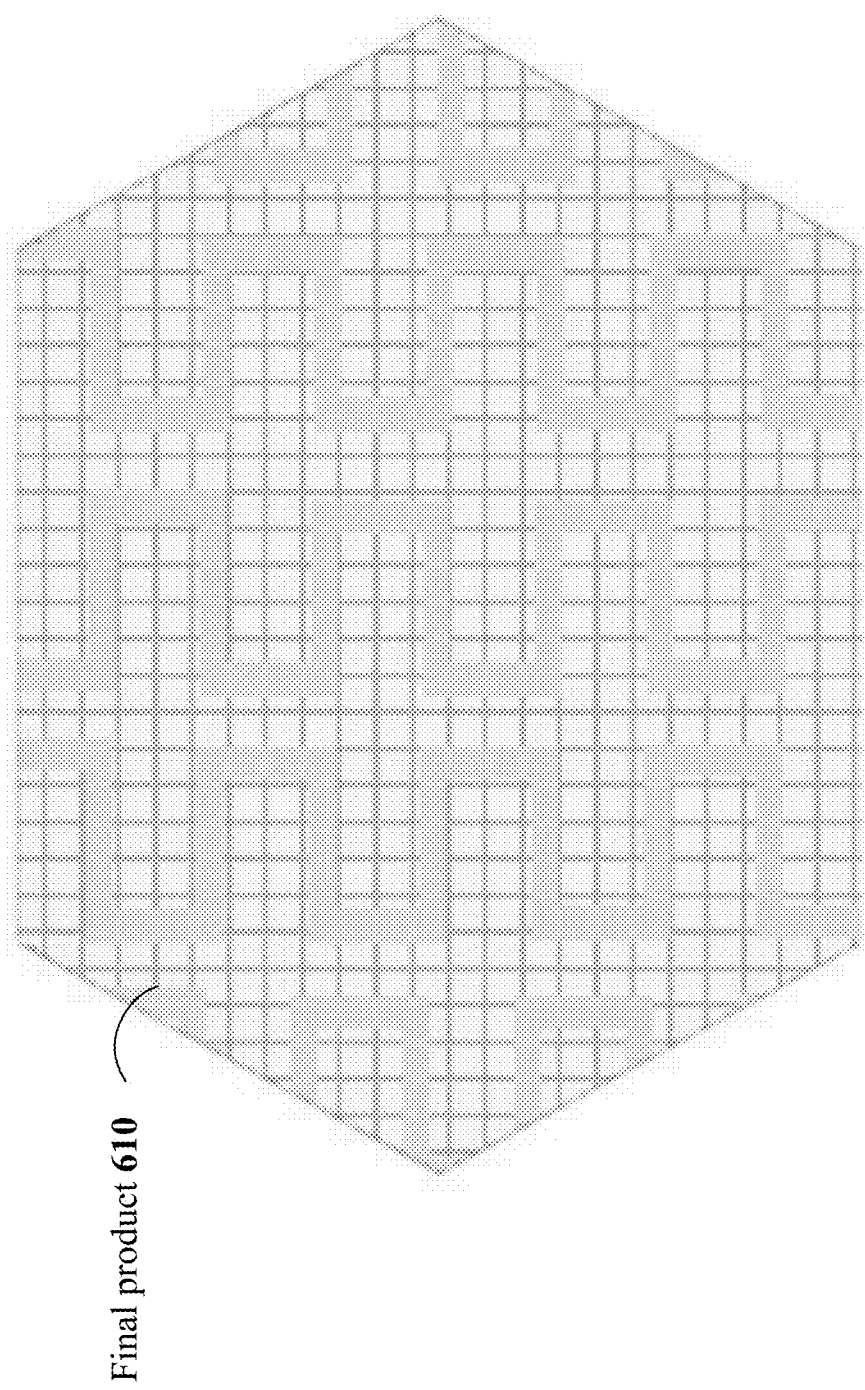
FIG. 8 is an example illustration of trimming the edges of the final assembly to the size and shape of the final product.

The final assembly 600 is a thin component comprising a final product 610. The size of the final assembly 600 is limited by the materials and tools. For example, standard embedding material 100 may have dimensions of twelve inches wide and twelve inches long, however this disclosure is not so limited. As another example, a cutter with a maximum capacity to cut fifteen inches by fifteen inches may limit the size of the final assembly 600, but this disclosure is not so limited. The final assembly 600 may be trimmed or cut into a final product 610 to have appropriate dimensions that enable a functional thin component, as seen in FIG. 8. In some embodiments, the final product 610 may be a microwave tuned component, and may be for shielding, circuits, or screening.

The final assembly 600 may also be configured to stack with a plurality of subsequent layers to form a multilayer assembly. A multilayer assembly comprises a plurality of additional lawyers comprising embedding material 100 and substrate 200. A multilayer assembly may be constructed by implementing method 10 and further comprising repeating the steps of claim 1 to form at least one new final product; and adhering each of the at least one new final product to the final product to form a multilayer assembly, wherein each of the new final products are adhered to a side parallel to the embedding material. In one embodiment, these additional layers may comprise a plurality of final assemblies 600, wherein each subsequent final assembly is fixed to the side opposite the contact side of another final assembly. The multilayer assembly may enable a third dimension into the design, which may enable, for example, three-dimension microwave components. The additional layers may be used to create tuned microwave components that cannot be achieved on a single layer. Examples include certain types of filters, transmission lines, and antennas. The layers may be connected with coupling or potentially with vias. Other layers may also facilitate control signals or enable the running of power. Furthermore, a multilayer assembly may require different tooling than a final assembly. For example, cutting instruments may need to accommodate a larger thickness.

In one embodiment, method 10 may include adhering additional layer of embedding material 100 and substrate 200. These subsequent layers added to the final assembly 600 may be incorporated by repeating the method 10 of using LOCA for support of thin component describe herein, and further comprising the step of fixing the new final assembly to the multiplayer assembly.

In one embodiment, method 10 may further comprise the step of placing a plastic sheet on top of the assembly; and squeegeeing the assembly to spread the second LOCA 420 evenly over the detailed design 110, wherein the design are comprises the embedded material 100. Furthermore, working from the center out and removing any air bubbles to the edges will help result in a uniform final product. The plastic sheet is optional, but helps reduce scratches on the final product. Isopropyl alcohol may then be used to wipe up the excess second LOCA 420. In another embodiment, a press may be used to squeeze out any excess second LOCA 420.

FIG. 8 is an example illustration of trimming the edges of the final assembly 600 to the size and shape of the final product 610. In some embodiments, the final assembly 600 may be a microwave tuned components, shielding, circuits, or screening. The final product 610, for example, may enable these aforementioned functionalities or constructions.

The size of the embedding material 100, substrate 200, and release liner 300 are of a size sufficient to create the final product 610 on the final assembly 600. If the embedding material 100, substrate 200, and release liner 300 are too large, they may be cut to an appropriate size relative to the final product 610. The method 10 may further comprise the step of cutting the release liner to a size larger than a final product 610. The method 10 may also comprise the step of cutting the substrate to a size larger than the final product 610, wherein the substrate has a contact side. The method 10 may also comprise the step of cutting the embedding material to a size larger than the final product 610.

In another embodiment, a method of using liquid optically clear adhesive for multilayered thin components, comprising the steps of: placing a release liner and a substrate on a work surface; determining the placement location of the embedding material, wherein the placement location is on either the contact side of the substrate or the release side of the release liner, based on which placement location is better suited for static cling on the embedding material; positioning the embedding material on the determined placement location; applying a first LOCA onto the embedding material and the placement location; sandwiching the embedding material between the contact side of the substrate and the release side of the release liner to create an initial assembly, wherein the substrate and release liner are aligned; curing the first LOCA with an ultraviolet light; removing the release liner from the initial assembly; securing the substrate onto a cutting mat with the embedding material and first LOCA facing up; cutting a detailed design, wherein cutting defines the detailed design and an unwanted embedding material; transferring the initial assembly to the work surface with the first LOCA and embedding material facing up; removing the unwanted embedding material from the initial assembly; applying a second LOCA onto the embedding material and a second substrate to form a final assembly, wherein the quantity of second LOCA applied is at least enough to cover the detailed design; curing the second LOCA with the ultraviolet light; cleaning the final assembly by wiping up excess first LOCA and second LOCA with isopropyl alcohol; repeating steps 1-16 to create a new initial assembly comprising a new embedding material and the final assembly, wherein the final assembly acts as the substrate in the new initial assembly, the final assembly having a contact side that opposite the side interfacing with the embedding material; applying LOCA to the new exposed embedding material, wherein the quantity of second LOCA applied is at least enough to cover the detailed design; sandwiching the embedding material between the contact side of the final assembly and a new release side of a new release liner to create a multilayered assembly, wherein the final assembly and new release liner are aligned; repeating steps 16-18 to add additional layers to the multilayered assembly; and trimming the edges of the multi-layered assembly to the size and shape of a final multi-layered product.

From the above description of method 10 of using LOCA for support of thin components, it is manifest that various techniques may be used for implementing the concepts of a method 10 of using LOCA for support of thin components without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the secure a method 10 of using LOCA for support of thin components is not limited to the particular embodiments described herein, but is capable of many embodiments without departing from the scope of the claims.

What is claimed:

1. A method of using liquid optically clear adhesive for support of thin components, comprising the steps of:
    placing a release liner and a substrate on a work surface;
    determining a placement location of an embedding material having the greatest static cling, wherein the placement location is on either a contact side of the substrate or a release side of the release liner;
    positioning the embedding material on the determined placement location;
    applying a first LOCA onto the embedding material and the placement location;
    sandwiching the embedding material between the contact side of the substrate and the release side of the release liner to create an initial assembly, wherein the substrate and release liner are aligned;

curing the first LOCA with an ultraviolet light;

removing the release liner from the initial assembly;

securing the substrate onto a cutting mat with the embedding material and first LOCA facing up;

cutting a detailed design, wherein cutting defines the detailed design and an unwanted embedding material and wherein the detailed design has a geometry configured to enable the functionality of a thin microwave component;

transferring the initial assembly to the work surface with the first LOCA and embedding material facing up;

removing the unwanted embedding material from the initial assembly;

applying a second LOCA onto the detailed design;

sandwiching the detailed design between the contact side of a second substrate and initial assembly to form a final assembly, wherein the quantity of second LOCA applied is at least enough to cover the detailed design;

curing the second LOCA with the ultraviolet light;

cleaning the final assembly by wiping up excess first LOCA and second LOCA with isopropyl alcohol; and trimming the edges of the final assembly to the size and shape of a final product.

2. The method of using liquid optically clear adhesive for support of thin components of claim 1, further comprising the steps of:
placing a plastic sheet on top of the initial assembly; and
squeegeeing the initial assembly to spread the first LOCA evenly over the detailed design.

3. The method of using liquid optically clear adhesive for support of thin components of claim 1, further comprising the steps of:
placing a plastic sheet on top of the final assembly; and
squeegeeing the final assembly to spread the second LOCA evenly over the detailed design.

4. The method of using liquid optically clear adhesive for support of thin components of claim 1, further comprising the steps of:
cutting the release liner to a size larger than the final product.

5. The method of using liquid optically clear adhesive for support of thin components of claim 1, further comprising the steps of:
cutting the substrate to a size larger than the final product, wherein the substrate comprises the contact side of the substrate.

6. The method of using liquid optically clear adhesive for support of thin components of claim 1, further comprising the steps of:
cutting the embedding material to a size larger than the final product.

7. The method of using liquid optically clear adhesive for support of thin components of claim 1, wherein the first LOCA is a low-strength adhesive.

8. The method of using liquid optically clear adhesive for support of thin components of claim 2, wherein the second LOCA is a high-strength adhesive.

9. The method of using liquid optically clear adhesive for support of thin components of claim 1, further comprising:
repeating the steps of claim 1 to form at least one new final product; and
adhering each of the at least one new final product to the final product to form a multilayer assembly, wherein each of said at least one new final product are adhered to a side parallel to the embedding material.

10. A method of using liquid optically clear adhesive for multilayered thin components, comprising the steps of:
1) placing a release liner and a substrate on a work surface;
2) determining a placement location of an embedding material having the greatest static cling, wherein the placement location is on either a contact side of the substrate or a release side of the release liner;
3) positioning the embedding material on the determined placement location;
4) applying a first LOCA onto the embedding material and the placement location;
5) sandwiching the embedding material between the contact side of the substrate and the release side of the release liner to create an initial assembly, wherein the substrate and release liner are aligned;
6) curing the first LOCA with an ultraviolet light;
7) removing the release liner from the initial assembly;
8) securing the substrate onto a cutting mat with the embedding material and first LOCA facing up;
9) cutting a detailed design, wherein cutting defines the detailed design and an unwanted embedding material and wherein the detailed design has a geometry configured to enable the functionality of a thin microwave component;
10) transferring the initial assembly to the work surface with the first LOCA and embedding material facing up;
11) removing the unwanted embedding material from the initial assembly;
12) applying a second LOCA onto the embedding material and a second substrate to form a final assembly, wherein the quantity of second LOCA applied is at least enough to cover the detailed design;
13) curing the second LOCA with the ultraviolet light;
14) cleaning the final assembly by wiping up excess first LOCA and second LOCA with isopropyl alcohol;
15) repeating steps 1-14 to create a new initial assembly comprising a new embedding material and the final assembly, wherein the final assembly acts as the substrate in the new initial assembly, the final assembly having a contact side opposite the side interfacing with the new embedding material;
16) repeating step 15 to add additional layers to the multilayered assembly; and
17) trimming the edges of the multi-layered assembly to the size and shape of a final multi-layered product.

* * * * *